3,050,429
POLYETHYLENE INHIBITOR FOR PROPELLANT GRAINS

Jack H. Baxby, China Lake, Calif., assignor to the United States of America as represented by the Secretary of the Navy
No Drawing. Filed Mar. 24, 1959, Ser. No. 801,670
1 Claim. (Cl. 156—86)
(Granted under Title 35, U.S. Code (1952), sec. 266)

The invention herein described may be manufactured and used by or for the Government of the United States of America for governental purposes without the payment of any royalties thereon or therefor.

This invention relates to the control of burning of propellant grains; more specifically it relates to inhibiting double-base, nitrocellulose-nitroglycerin grain surfaces with polyethylene.

Numerous materials and methods have been used in the past to inhibit grains. One very common technique in use presently is to coat the grain with an adhesive mixture of ethyl lactate and butyl acetate and then wrap the grain with ethyl cellulose tape. However, nitroglyerin in the grain tends to migrate into the ethyl cellulose tape and after long storage, appreciable quantities of nitroglycerin will be found in the tape, seriously affecting its inhibiting function. Further, present methods of inhibiting are expensive and time consuming.

Polyethylene has long been recognized and an excellent inhibiting material because it is cheap, is inert, both physically and chemically to propellant ingredients, and has a burning rate substantially different from double-base grains. Heretofore no practical way to bond it to grains was known.

It is therefore the object of this invention to provide a method for bonding polyethylene to double-base propellant grains.

The object is accomplished with the use of a particular bonding agent. After machining and X-raying the grain the surface to be inhibited is coated with a thin layer of the bonding agent and a piece of sheet or preformed polyethylene laid over the coating. Low pressure is applied until the bonding agent hardens and forms the bond.

The bonding agent is composed of two parts, the adhesive itself, and the hardener which initiates the bond formation. Adhesive and hardener are mixed immediately prior to use in proportions ranging from about 20% to about 50% by weight adhesive and the remainder hardener.

The adhesive is essentially an epoxied resin, the diglycidyl ether of p-p isopropylidenediphenyl having a degree of polymerization ranging from 1 to about 4 on the average. Additionally, up to about 20% butyl glycidyl ether solvent and up to about 10% of a thickening agent of asbestos fibers, chopped glass roving, carbon black, silica, bentonite clay, or the like may be added to the epoxy resin to obtain a desired viscosity.

The hardener is a condensation product of a polymerized fatty acid having a degree of polymerization of 1 to about 4 and an aliphatic polyamine having a viscosity of from about 5,000 to about 10,000 cps. at 25° C. and an amine number of from about 300 to 400. Preferred fatty acids are linoleic and linolenic, while preferred amines are ethylene diamine, diethylene triamine, triethylene tetramine, tetraethylene pentamine.

When a cylindrical grain is to be externally inhibited, a simple technique results from the use of tubular irradiated polyethylene. The polyethylene is first molded to a predetermined size, then expanded to another predetermined size and irradiated with neutrons or electrons in accordance with techniques well known in the art. Upon being heated sufficiently, the material returns to the first predetermined size.

The diameter of the polyethylene tube in the first predetermined size is chosen to be slightly smaller than the diameter of the propellant grain while the diameter of the tube in the second predetermined size is chosen to be slightly larger than the grain diameter.

The grain is coated with the bonding agent and is slipped into the tubular material which is then heated until the tubular polyethylene attempts to return to its first predetermined size and in so doing shrinks about the grain. Upon hardening of the bonding agent the bond is complete.

Grains prepared by the method outlined in the preceding paragraph were temperature cycled between —65° F. and 165° F. for a dozen times and static fired in motors. Burning was very smooth with no pressure peaks which would indicate that the inhibitor had failed in any way.

Obviously many modifications and variations of the present invention are possible in the light of the above teachings. It is therefore to be understood that within the scope of the appended claim the invention may be practiced otherwise than specifically described.

What is claimed is:

The method of bonding polyethylene to double-base, nitrocellulose-nitroglycerin, propellant grains which comprises coating the surface to be inhibited with a bonding agent comprising (a) diglycidyl ether of p-p isopropylidenediphenyl having a degree of polymerization of from 1 to about 4 on the average and (b) the condensation product of a fatty acid having a degree of polymerization of from 1 to about 4 on the average and an aliphatic polyamine having a viscosity of from about 5,000 to about 10,000 cps. at 25° C. and an amine number of from about 300 to 400, covering the bonding agent with a polyethylene boundary, and applying pressure by shrinking said polyethylene upon said grain until the bond is formed.

References Cited in the file of this patent
UNITED STATES PATENTS

| | | |
|---|---|---|
| 1,830,236 | Metz | Nov. 3, 1931 |
| 2,171,118 | Ball | Aug. 29, 1939 |
| 2,703,528 | Lee et al. | Mar. 8, 1955 |
| 2,828,219 | Heiges et al. | Mar. 25, 1958 |
| 2,830,721 | Pinsky et al. | Apr. 15, 1958 |
| 2,890,552 | Henderson | June 16, 1959 |
| 2,899,397 | Aelony | Aug. 11, 1959 |
| 2,966,439 | Sorel | Dec. 27, 1960 |
| 2,977,664 | Grajeck | Apr. 4, 1961 |

OTHER REFERENCES

Ind. and Eng. Chemistry, vol. 46, No. 10, October 1954, pages 2226–2232.